O. W. ALEXANDER.
Fruit-Corers.
No. 133,914.            Patented Dec. 17, 1872.
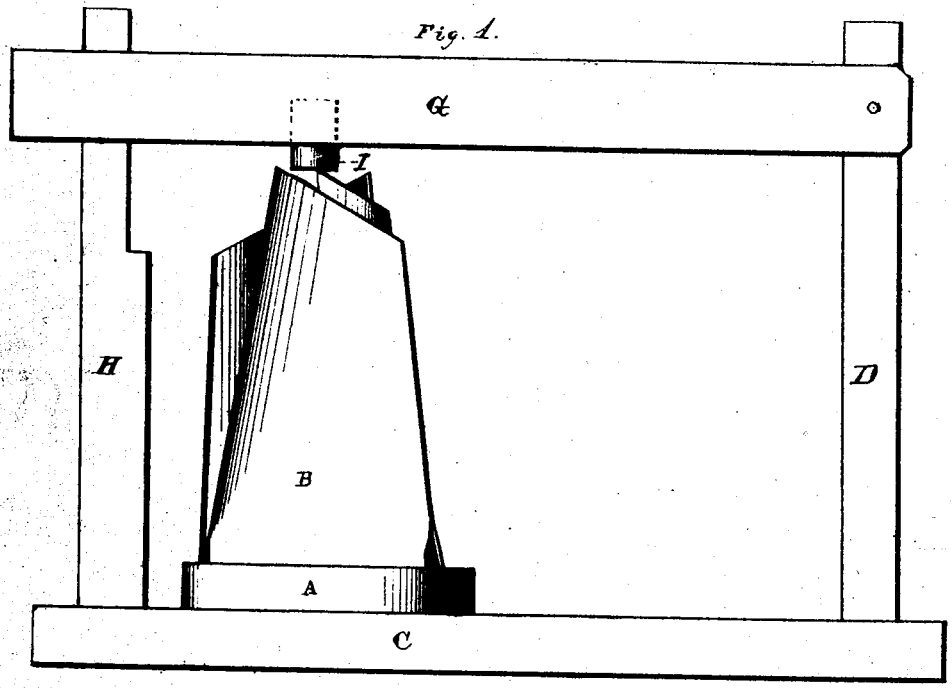
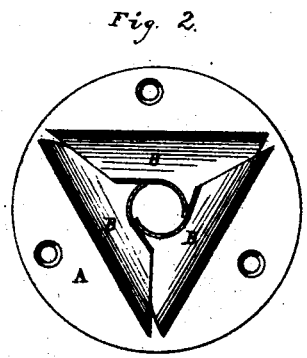
Witnesses.
Inventor.
Oscar W. Alexander
Per H. S. Abbot
Attorney

UNITED STATES PATENT OFFICE.

OSCAR W. ALEXANDER, OF OSAGE, TEXAS.

IMPROVEMENT IN FRUIT-CORERS.

Specification forming part of Letters Patent No. 133,914, dated December 17, 1872.

*To all whom it may concern:*

Be it known that I, O. W. ALEXANDER, of Osage, county of Colorado, and State of Texas, have invented a new and Improved Fruit-Corer; and I declare the following to be a full, clear, and exact description of the same, such as will enable others skilled in the art to which it appertains to make and use the same, reference being had to the accompanying drawing which forms a part of this specification.

My invention relates to that class of devices for stoning or coring fruit and cutting it into slices; and consists in three or more plates having their upper ends curved and sharpened to a point, so that when the fruit is pressed down upon them the core or stone will be nicely removed, while the fruit itself will be evenly divided into three slices.

Figure 1 is a side elevation of my device. Fig. 2 is a plan view of the same.

A represents a metal ring or base, which is intended to be secured permanently or temporarily to a table or board, C, over an aperture large enough to let the core or stone fall through into a receptacle placed beneath. Fastened to this base are three flat plates, B, having their upper ends sharpened to cutting points and edges, and curved so as to overlap each other on their inner edges, while the outer ones project outward, increasing in width toward the bottom. The opening or hole formed by these curved ends should be just large enough to nicely cut out the stone or core of apples and peaches, letting it fall through the board or table, while the outer edges should project far enough to cut through the body of the fruit, thus dividing it evenly into three pieces. The points being sharpened in the manner shown makes the cutting much more easily and rapidly done. Secured to one end of the table or base C is a standard, D, to which a lever, G, having stud I, is attached, its opposite end being slotted and held in place by the standard H, for forcing the fruit down upon the points.

Having thus described my invention, what I claim as new, and desire to secure by Letters Patent of the United States, is—

1. The plates B, having their ends sharpened and curved, in combination with the base-plate A, substantially as shown and described.

2. The lever G, pivoted upon standard D and having stud I, in combination with plates B, forming a fruit-corer, substantially as set forth and described.

In testimony that I claim the foregoing as my invention I hereto affix my signature this 5th day of October, 1872.

O. W. ALEXANDER.

Witnesses:
 LYLE J. LOGUE,
 LYMAN W. ALEXANDER.